US010142341B2

(12) United States Patent
Kunz et al.

(10) Patent No.: US 10,142,341 B2
(45) Date of Patent: Nov. 27, 2018

(54) APPARATUS, SYSTEM AND METHOD FOR WEBRTC

(71) Applicant: NEC Corporation, Tokyo (JP)

(72) Inventors: Andreas Kunz, Heidelberg (DE); Xiaowei Zhang, Tokyo (JP); Anand Raghawa Prasad, Tokyo (JP)

(73) Assignee: NEC Corporation, Tokyo (JP)

( * ) Notice: Subject to any disclaimer, the term of this patent is extended or adjusted under 35 U.S.C. 154(b) by 155 days.

(21) Appl. No.: 15/105,310

(22) PCT Filed: Dec. 18, 2014

(86) PCT No.: PCT/JP2014/006334
§ 371 (c)(1),
(2) Date: Jun. 16, 2016

(87) PCT Pub. No.: WO2015/093058
PCT Pub. Date: Jun. 25, 2015

(65) Prior Publication Data
US 2016/0315938 A1    Oct. 27, 2016

(30) Foreign Application Priority Data

Dec. 19, 2013  (JP) ................................. 2013-262170
Jan. 9, 2014   (JP) ................................. 2014-002633

(51) Int. Cl.
*H04W 12/06*  (2009.01)
*H04L 29/06*  (2006.01)
*H04L 29/08*  (2006.01)
*H04W 12/12*  (2009.01)

(52) U.S. Cl.
CPC .......... *H04L 63/0892* (2013.01); *H04L 63/10* (2013.01); *H04L 65/1016* (2013.01);
(Continued)

(58) Field of Classification Search
CPC ........................... H04L 63/0892; H04W 12/06
See application file for complete search history.

(56) References Cited

U.S. PATENT DOCUMENTS

| | | | | |
|---|---|---|---|---|
| 2010/0263032 | A1* | 10/2010 | Bhuyan | ................ H04L 63/061 726/7 |
| 2013/0081123 | A1* | 3/2013 | Przybysz | .............. H04L 63/062 726/7 |
| 2013/0227663 | A1* | 8/2013 | Cadenas Gonzalez | ..................... H04L 63/0815 726/6 |

(Continued)

FOREIGN PATENT DOCUMENTS

JP        2005-524255       8/2005

OTHER PUBLICATIONS

Ericsson, ST-Ericsson, "Solution 1—Procedures and Call flows", 3 GPP TSG-SA WG2 #99, S2-133707, Sep. 27, 2013.

(Continued)

*Primary Examiner* — David J Pearson
(74) *Attorney, Agent, or Firm* — Finnegan, Henderson, Farabow, Garrett & Dunner, L.L.P.

(57) ABSTRACT

There is provided a solution as to how the authentication and thus the authorization of the webRTC IMS Client can be achieved in the IMS of the mobile network operator. The WIC (20) is using an ID to register with IMS, which may be an IMPU, an IMPI, gGRUU etc. The WIC (20) may be preconfigured by the WWSF (30) with the eP-CSCF (40) address and authentication information, but if not, then this information should be retrieved via the WWSF (30) or from the IMS directly or via other device management procedures e.g. OMA DM. It is further assumed that the subscriber has already a valid webRTC account/membership and this can be validated, authenticated and authorized by the WWSF (30).

18 Claims, 14 Drawing Sheets

(52) U.S. Cl.
CPC ........ *H04L 65/1073* (2013.01); *H04L 65/608* (2013.01); *H04L 67/02* (2013.01); *H04W 12/06* (2013.01); H04L 63/0807 (2013.01); H04L 2463/141 (2013.01); H04W 12/12 (2013.01)

(56) References Cited

U.S. PATENT DOCUMENTS

| | | | | |
|---|---|---|---|---|
| 2014/0189834 A1* | 7/2014 | Metke | ................... | H04W 12/06 726/7 |
| 2014/0222930 A1* | 8/2014 | Gangadharan | .......... | H04L 51/04 709/206 |

OTHER PUBLICATIONS

Notification of Reasons for Refusal issued by Japanese Patent Office in counterpart Japanese Patent Application No. 2016-557360 dated Nov. 7, 2017.

3GPP TR 23.701 V0.3.0, $3^{rd}$ Generation Partnership Project; Technical Specification Group Services and System Aspects; Study on Web Real Time Communication (WebRTC) access to IMS (Stage 2) (Release 12), Retrieved from the Internet: URL:http://www.3gpp.org/ftp/tsg_sa/WG2_Arch/Latest_SA2_Specs/Latest_draft_S2_Specs/, Nov. 2013.

3GPP TR 33.abc V0.1.0, $3^{rd}$ Generation Partnership Project; Technical Specification Group Services and System Aspects; Study on Security for WebRTC IMS Client access to IMS (Release 12), Retrieved from the Internet:URL: http://www.3gpp.org/ftp/tsg_sa/WG3_Security/TSGS3_73_SanFrancisco/Docs/Drafts/, Nov. 2013.

3GPP TS 33.203 V12.3.0, $3^{rd}$ Generation Partnership Project; Technical Specification Group Services and System Aspects; 3G security; Access security for IP-based services (Release 12), pp. 1-122, Sep. 2013.

International Search Report and Written Opinion dated May 8, 2015, in corresponding PCT International Application.

Decision to Grant a Patent issued by Japanese Patent Office in counterpart Japanese Patent Application No. 2016-557360 dated Mar. 27, 2018.

* cited by examiner

APPARATUS, SYSTEM AND METHOD FOR WEBRTC

CROSS-REFERENCE TO RELATED PATENT APPLICATIONS

This application is a National Stage Entry of International Application No. PCT/JP2014/006334, filed Dec. 18, 2014, which claims priority from JP 2013-262170, filed Dec. 19, 2013 and JP 2014-002633, filed Jan. 9, 2014. The entire contents of the above-referenced applications are expressly incorporated herein by reference.

TECHNICAL FIELD

The present invention relates to an apparatus, a system and a method for webRTC (Web Real Time Communication), and particularly to a technique to secure authentication of a webRTC client to IMS (IP (Internet Protocol) Multimedia Subsystem).

BACKGROUND ART

A new service called webRTC, i.e. real time communication services like a voice and video calls, is specified in IETF (Internet Engineering Task Force) and it is taking up momentum. WebRTC interworks with other networks so that is not operating as a standalone silo service. This means for the end customer that you do not want to call only other webRTC users, but also normal phones.

In order to provide this functionality, studies in 3GPP (3rd Generation Partnership Project) is being carried as disclosed by NPL 1.

CITATION LIST

Non Patent Literature

NPL 1: 3GPP TR 23.701, "Study on Web Real Time Communication (WebRTC) access to IMS (Stage 2) (Release 12)", V0.3.0, 2013-11

NPL 2: 3GPP TR 33.abc (S3-131125), "Study on Security for WebRTC IMS Client access to IMS; (Release 12)", V0.1.0, 2013-11

SUMMARY OF INVENTION

Technical Problem

Although some security solutions are initiated in SA3 (security working group), current solutions and agreements there lack on secure authentication and authorization mechanisms of the webRTC client in the mobile device, when the webRTC client wants to register and connect to the mobile operator's IP Multimedia Subsystem (IMS). In order to prevent attacks to the operator's IMS system from the internet with arbitrary webRTC clients, that are not authenticated and/or not authorized, it is crucial to provide a secure solution to protect both the end customer and the mobile operator.

The issue of correct mapping (or binding) and allocation of identities to ensure authentication and authorization to IMS is depicted in FIG. 12.

The browser in the user equipment (UE) downloads the webRTC IMS Client (WIC) from the WebRTC Web Server Function (WWSF). The WWSF is responsible for managing the correct and consistent allocation of authorized IMS identities to WICs associated with authenticated web identities. It is proposed in 3GPP that the WWSF may reside in the operators home IMS or in a third party network authorized by the home IMS.

When UE access IMS service, the network should perform authorization to verify whether UE is allowed for accessing such service. In current system, there are two independent identities (webRTC identity and IMS identity) that are allocated from WWSF. If network fails to verify the identities, it may cause unauthorized WIC accessing IMS service and also DoS (Denial of Service) attack to network. The authorization procedures proposed in NPLs 1 and 2 are not sufficient for these threats.

It is required that network should verify the authentication and/or authorization carried by WWFS, in order to counter the threats. Binding between webRTC identity and IMS identity is necessary for network to perform the verification.

The following sections describe how the binding with an IMS identity is performed and how the IMS network is informed about this binding and whether additional authentication mechanism is needed.

Solution to Problem

This invention proposes in different aspects how the authentication and thus the authorization of the webRTC IMS Client can be achieved in the IMS of the mobile network operator. The WIC is using an ID to register with IMS, which may be an IMS public user identity (IMPU), a IMS private identity (IMPI), globally routable user agent URI (GRUU) etc.

The WIC may be preconfigured by the WWSF with the eP-CSCF address and authentication information, but if not, then this information should be retrieved via the WWSF or from the IMS directly or via other device management procedures e.g. OMA DM (Open Mobile Alliance Device Management).

It is further assumed that the subscriber has already a valid webRTC account/membership and this can be validated, authenticated and authorized by the WWSF.

A method according to first exemplary aspect of the present invention provides an authentication method in a communication system. This method includes: sending a token from a WWSF to a UE in an IMS registration; sending a REGISTER message with the token from the UE to an eP-CSCF; verifying the token by the eP-CSCF; forwarding the REGISTER message from the eP-CSCF to an S-CSCF; receiving a subscription profile from an HSS to the S-CSCF; and sending a 200 OK message from the S-CSCF to the UE via the eP-CSCF.

Further, a system according to second exemplary aspect of the present invention is a communication system for authenticating a UE. This system includes a WWSF, an eP-CSCF, an S-CSCF, and an HSS. The WWSF sends a token to the UE in an IMS registration. The UE sends a REGISTER message with the token to the eP-CSCF. The eP-CSCF verifies the token. The eP-CSCF forwards the REGISTER message to the S-CSCF. The S-CSCF receives a subscription profile from the HSS. The S-CSCF sends a 200 OK message to the UE via the eP-CSCF.

Further, a method according to third exemplary aspect of the present invention provides an authentication method of a UE. This method includes: receiving a token from a WWSF in an IMS registration; sending a REGISTER message with the token to an eP-CSCF that verifies the token and forwards the REGISTER message to an S-CSCF; and receiving a 200 OK message from the S-CSCF, the S-CSCF receiving a subscription profile from an HSS, via the eP-CSCF.

Furthermore, an apparatus according to fourth exemplary aspect of the present invention is a UE connectable to a communication system including a WWSF, an eP-CSCF, an S-CSCF, and an HSS. This UE includes: a receiving unit that receives a token from the WWSF in an IMS registration and receives a 200 OK message from the S-CSCF, the S-CSCF receiving a subscription profile from the HSS, via the eP-CSCF; and a sending unit that sends a REGISTER message with the token to the eP-CSCF, the eP-CSCF verifying the token and forwarding the REGISTER message to the S-CSCF.

Advantageous Effects of Invention

According to the present invention, it is possible to secure authentication of a webRTC client to IMS, for example.

DESCRIPTION OF EMBODIMENTS

Hereinafter, first to third exemplary embodiments according to the present invention will be described with the accompanying drawings.

First Exemplary Embodiment

Figure 1:
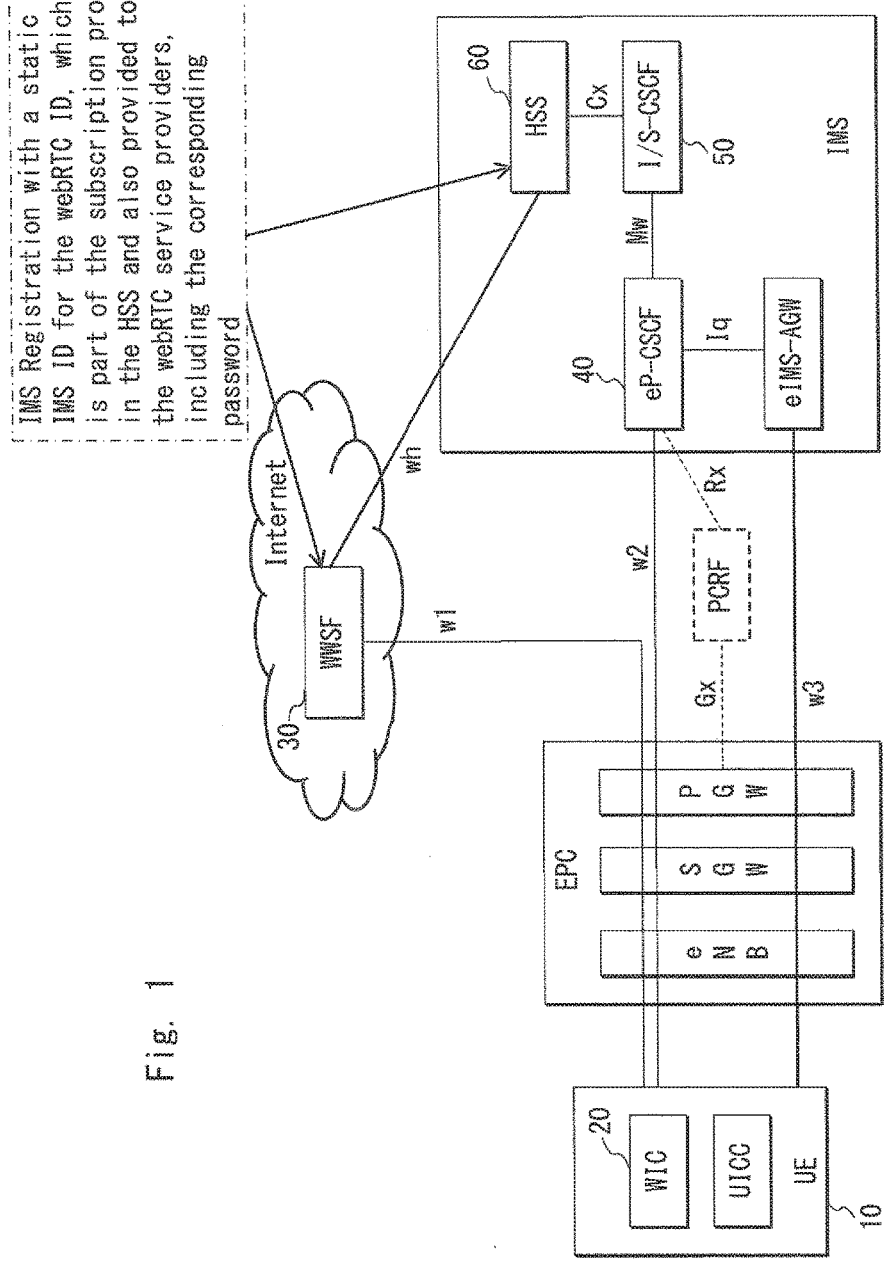
FIG. 1 is a block diagram showing an example of static IMS ID allocation in a first exemplary embodiment according to the present invention.

This exemplary embodiment proposes a static IMS ID allocation to the WWSF per webRTC identity. FIG. 1 shows the principle of the identity binding.

The WWSF 30 and the HSS (Home Subscriber Server) 60 are able to exchange identity information via the wh interface. The information contains for a specific webRTC identity the corresponding IMS ID and, if needed, a password for IMS authentication, but this is not limited to this set of parameters.

Figure 2:
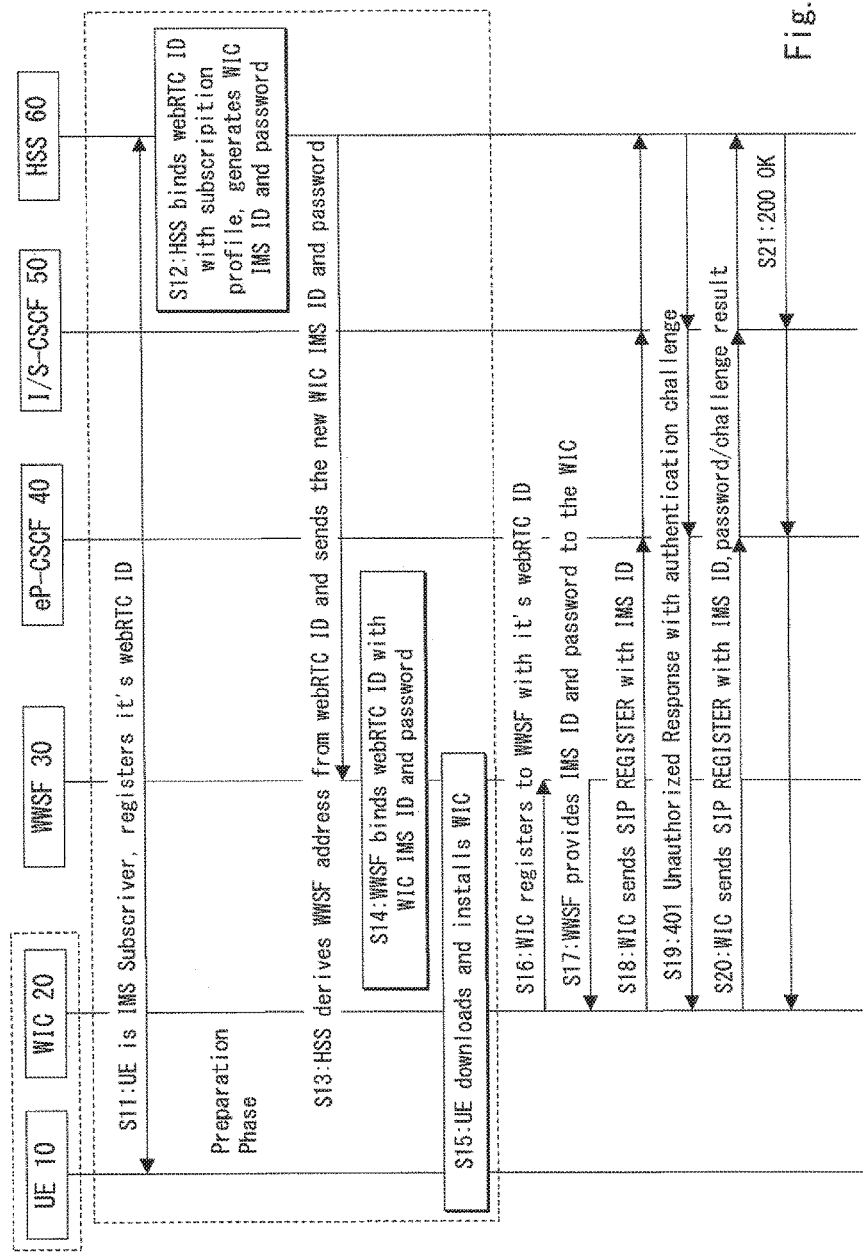
FIG. 2 is a sequence diagram showing an example of call flow for static IMS ID allocation in the first exemplary embodiment.

FIG. 2 provides the call flow for an IMS registration with a previous preparation phase in the steps S11 to S15.

Step S11: The UE 10 is an IMS subscriber and a webRTC subscriber and registers also its webRTC ID with the IMS operator. This may be done in an ordinary IMS registration message of its normally used IMS client during its IMS registration.

Step S12: The HSS 60 creates a binding between the webRTC ID and the IMS ID. It creates a new WIC IMS ID and if needed, a corresponding password or other authentication related information. The IMS ID of the WIC is different to the one of the normal IMS client.

Step S13: The HSS 60 derives the WWSF address from the webRTC ID. The HSS 60 may have a look-up table for each webRTC provider to find the WWSF 30, or it has a fixed format e.g. "wwsf@webrtcprovider.com". The HSS 60 provides the generated WIC IMS ID, password and webRTC ID to the WWSF 30 via the wh interface. The HSS 60 may provide other subscription or authentication related information too. The WIC 20 may not be able to retrieve a correct eP-CSCF (enhanced Proxy-Call Session Control Function) address; therefore the HSS 60 may include the eP-CSCF address in this message. The information depends also whether the WIC 20 is preconfigured e.g. by the WWSF 30 or not.

Step S14: The WWSF 30 creates a binding between the webRTC ID and the WIC IMS ID and if provided the password and other information.

Step S15: From within a WebRTC-enabled browser, the user may access a URI (Uniform Resource Identifier) to the WWSF 30 to initiate an HTTPS (Hypertext Transfer Protocol Secure) connection to the WWSF 30. The TLS (Transport Layer Security) connection may provide one-way authentication of the server based on the server certificate. The browser downloads and initializes the WIC 20 from the WWSF 30, now the preparation phase is completed.

Step S16: The WIC 20 registers to the WWSF 30 with its webRTC ID. The WWSF 30 may authenticate the user using a common web authentication procedure.

Step S17: The WWSF 30 provides the corresponding IMS ID and, if available, password, eP-CSCF address, authentication information etc. to the WIC 20. The information depends also whether the WIC 20 is preconfigured or not.

Step S18: The WIC 20 stores the received information and sends a REGISTER message to the eP-CSCF 40, using the WIC IMS ID. This message may be preferably a SIP (Session Initiation Protocol) message but could be based on any other protocol like WebSocket, JSON (JavaScript Object Notation) etc.

Step S19: The S-CSCF (Serving-CSCF) 50 retrieves the authentication data from the HSS 60 and challenges the UE 10 with a 401 unauthorized response. This message may be preferably a SIP message but could be based on any other protocol like WebSocket, JSON etc.

Step S20: The WIC 20 resolves the challenges with the information received from the WWSF 30 (password, other authentication related information) and sends another REGISTER message to the eP-CSCF 40. This message may be preferably a SIP message but could be based on any other protocol like WebSocket, JSON etc.

Step S21: The S-CSCF 50 acknowledges the registration with a 200 OK or any other suitable message towards the WIC 20 and retrieves the subscription profile from the HSS 60. This message may be preferably a SIP message but could be based on any other protocol like WebSocket, JSON etc.

This exemplary embodiment requires that the webRTC user is also an IMS subscriber at the same time. The HSS 60 needs to interface with webRTC service provider and exchange the IMS ID+password and eP-CSCF address, since the WIC 20 cannot access the UICC (Universal Integrated Circuit Card) and has no P-CSCF allocation.

Second Exemplary Embodiment

Figure 3:
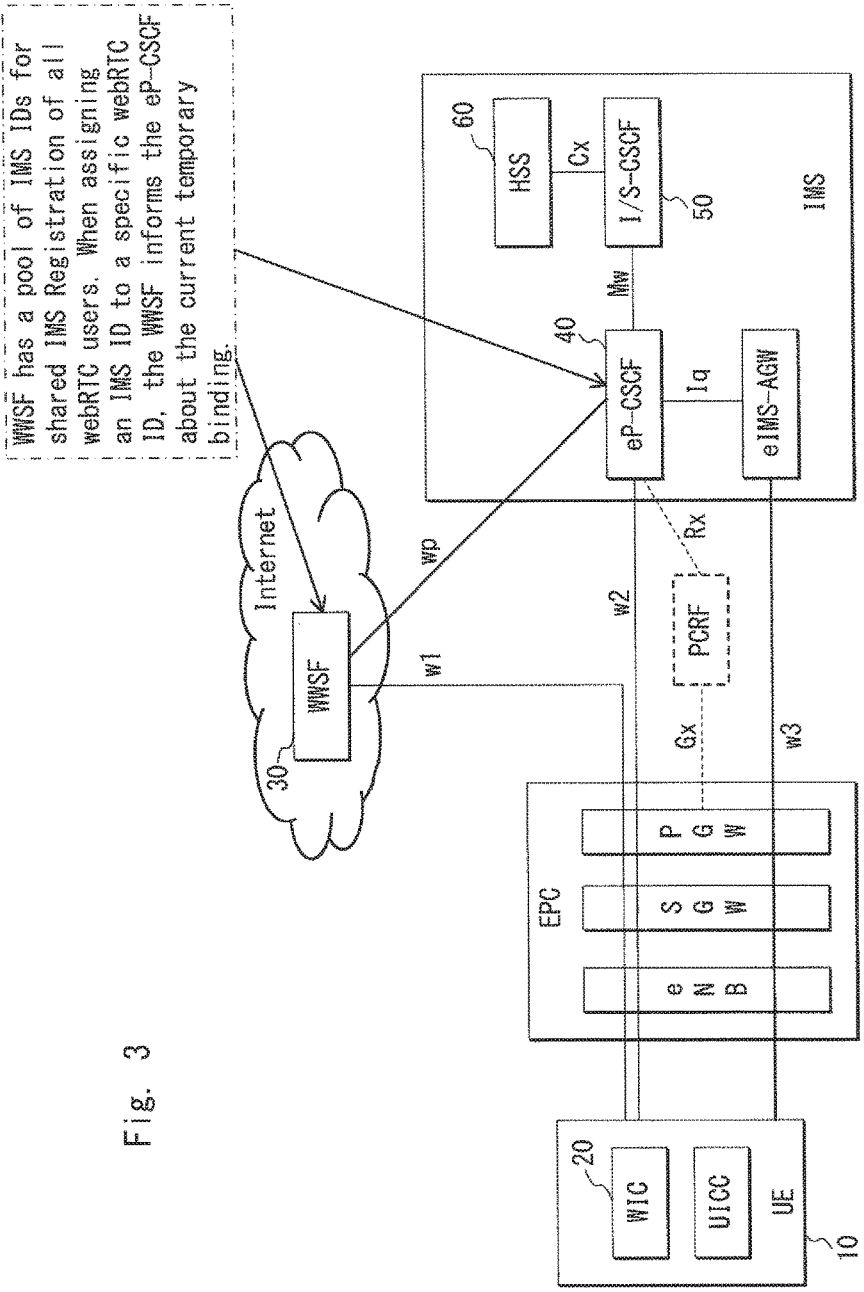
FIG. 3 is a block diagram showing an example of dynamic IMS ID allocation in a second exemplary embodiment according to the present invention.

In this exemplary embodiment, the WWSF is using a pool of IMS IDs received from the HSS of the IMS operator. The idea behind is that the webRTC service provider does not assume that the webRTC user has an own IMS subscription so the webRTC provider holds a pool of IMS subscriptions that can be assigned to the webRTC IMS client (WIC) on demand. The architecture is shown in FIG. 3.

The pool of IMS IDs can be provided to the WWSF 30 in form of wildcarded IMPUs, but it could be also a list of IMPUs and is not limited to this.

Figure 4:
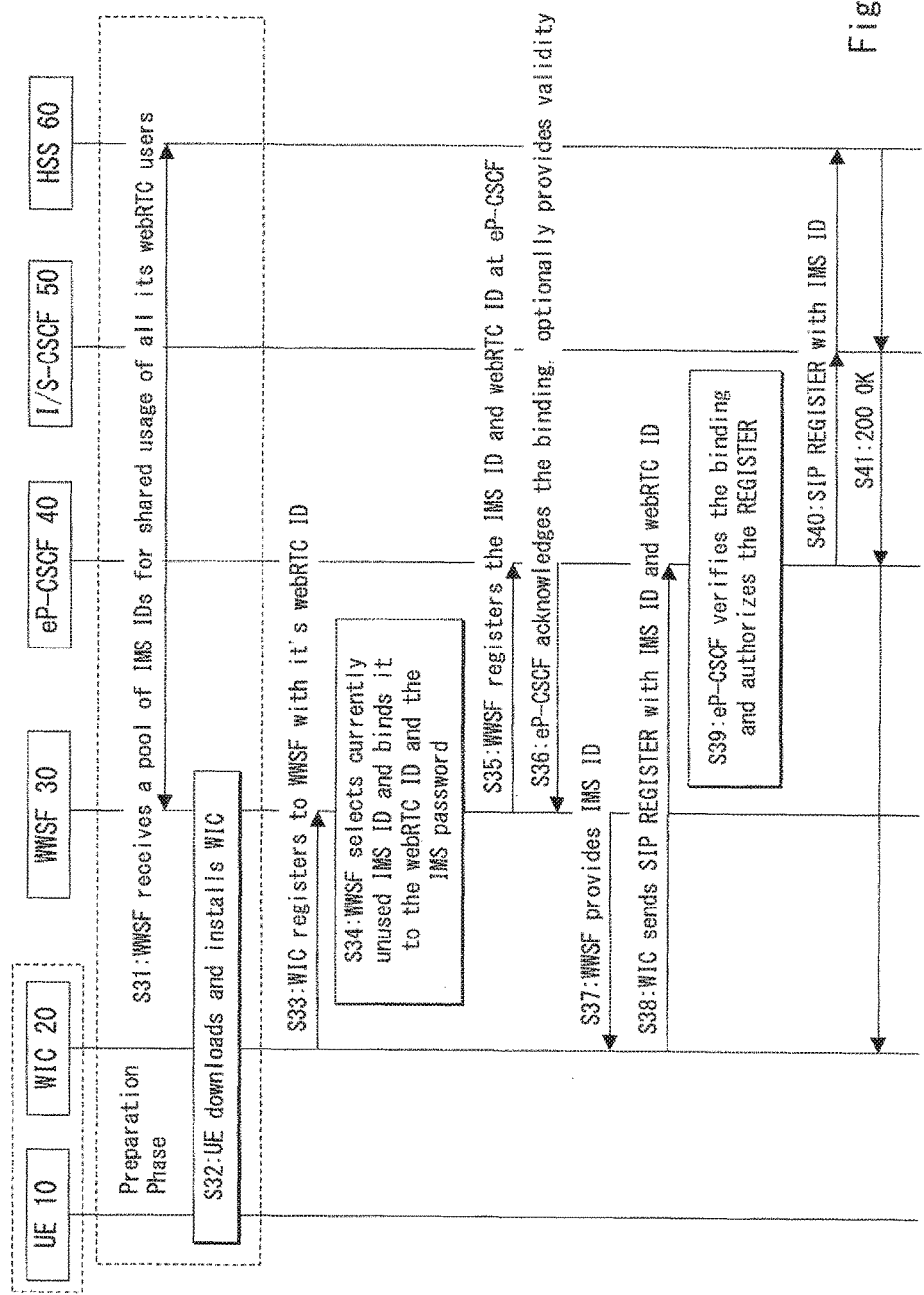
FIG. 4 is a sequence diagram showing one example of call flow for dynamic IMS ID allocation in the second exemplary embodiment.

FIG. 4 shows the call flow of the procedure.

Step S31: The WWSF 30 is pre-configured with a pool of IMS IDs, e.g. wildcarded IMPUs or a list of IMPUs that will be shared by the webRTC users on demand. The HSS 60 provides the configuration to WWSF 30 and may also provide additional information e.g. eP-CSCF address, authentication information, password etc.

Step S32: From within a WebRTC-enabled browser, the user may access a URI to the WWSF 30 to initiate an HTTPS connection to the WWSF 30. The TLS connection may provide one-way authentication of the server based on the server certificate. The browser downloads and initializes the WIC 20 from the WWSF 30, now the preparation phase is completed.

Step S33: The WIC 20 registers to the WWSF 30 with its webRTC ID. WWSF 30 may initiate authentication procedure if needed.

Step S34: The WWSF 30 selects a currently unused IMS ID or, in case of wildcarded IMPUs, generates an IMPU e.g. based on the webRTC ID. The WWSF 30 binds this IMS ID to the webRTC ID and, if available, binds the IMS ID to password, eP-CSCF address, authentication information etc. The information depends also whether the WIC 20 is pre-configured by the WWSF 30 with the eP-CSCF address and authentication information or not.

Step S35: The WWSF 30 registers the webRTC ID and IMS ID binding at the eP-CSCF 40.

Step S36: The P-CSCF 40 and WWSF 30 have a trust relationship and may be authenticated to each other. The eP-CSCF 40 stores the binding and acknowledges the binding. It may start a validity timer for the binding and provides the timer to the WWSF 30.

Step S37: The WWSF 30 provides the IMS ID, which binds to the webRTC ID, to the WIC 20.

Step S38: The WIC 20 stores the received information and sends a REGISTER message to the eP-CSCF 40, using the IMS ID. This message may be preferably a SIP message but could be based on any other protocol like WebSocket, JSON etc.

Step S39: The eP-CSCF 40 verifies the binding of webRTC ID and IMS ID and authorizes the REGISTER. The eP-CSCF 40 may include an indicator, flag or other parameter, showing that the binding is verified and/or registration is authorized, in the REGISTER so that it does not need to be challenged by the S-CSCF 50. This message may be preferably a SIP message but could be based on any other protocol like WebSocket, JSON etc.

Step S40: The eP-CSCF 40 forwards the REGISTER with the IMS ID to the S-CSCF 50 (potentially via other IMS nodes like IBCF (Interconnection Border Control Function) or I-CSCF (Interrogating-CSCF)) and may mark it as described in the previous step. The S-CSCF 50 requests the subscription profile from the HSS 60. This message may be preferably a SIP message but could be based on any other protocol like WebSocket, JSON etc.

Step S41: The S-CSCF 50 acknowledges the registration and retrieves the general subscription profile for this webRTC service provider from the HSS 60. The 200 OK or any other suitable message is forwarded to the WIC 20. This message may be preferably a SIP message but could be based on any other protocol like WebSocket, JSON etc.

Figure 5:
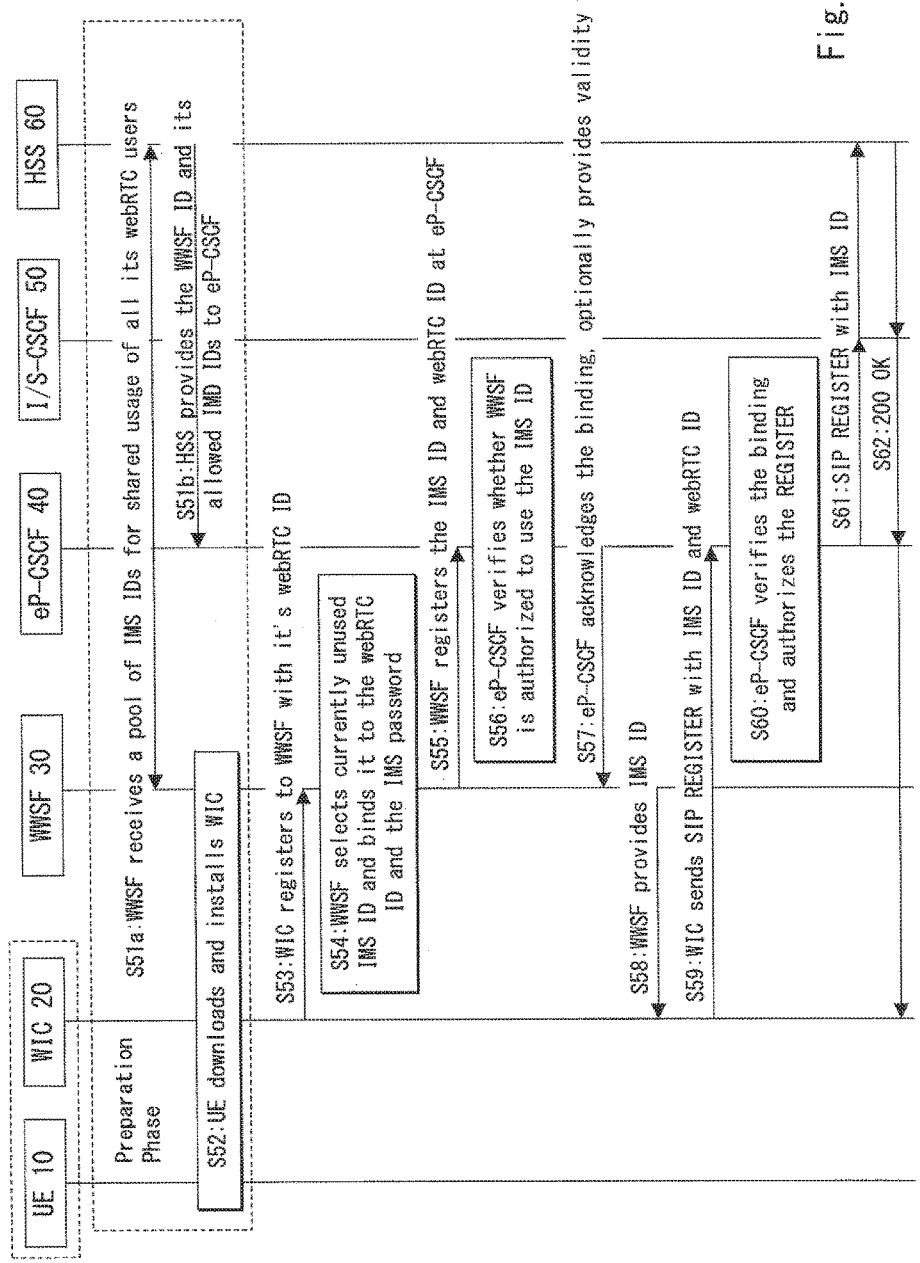
FIG. 5 is a sequence diagram showing another example of call flow for dynamic IMS ID allocation in the second exemplary embodiment.

In an alternative variant of this exemplary embodiment, the following call flow shown in FIG. 5 applies.

The same principles of the previous FIG. 4 apply, i.e. the steps are nearly the same, only two additional steps are included with step S51*b* and the verification step S56.

Step S51*a*: The WWSF 30 is pre-configured with a pool of IMS IDs, e.g. wildcarded IMPUs or a list of IMPUs that will be shared by the webRTC users on demand. The HSS 60 provides the configuration to WWSF 30 and may also provide additional information e.g. eP-CSCF address, authentication information, password etc.

Step S51*b*: The HSS 60 provides the WWSF ID and its allowed IMS IDs to the eP-CSCF 40. It may use PSI (Project Server Interface) routing and may use an appropriate SIP message, e.g. OPTIONS, UPDATE, INVITE, REGISTER, 200 OK, MESSAGE etc.

Step S52: From within a WebRTC-enabled browser, the user may access a URI to the WWSF 30 to initiate an HTTPS connection to the WWSF 30. The TLS connection may provide one-way authentication of the server based on the server certificate. The browser downloads and initializes the WIC 20 from the WWSF 30, now the preparation phase is completed.

Step S53: The WIC 20 registers to the WWSF 30 with its webRTC ID. WWSF 30 may initiate authentication procedure if needed.

Step S54: The WWSF 30 selects a currently unused IMS ID or, in case of wildcarded IMPUs, generates an IMPU e.g. based on the webRTC ID. The WWSF 30 binds this IMS ID to the webRTC ID and, if available, binds the IMS ID to password, eP-CSCF address, authentication information etc. The information depends also whether the WIC 20 is pre-configured by the WWSF 30 with the eP-CSCF address and authentication information or not.

Step S55: The WWSF 30 registers the webRTC ID and IMS ID binding at the eP-CSCF 40.

Step S56: The P-CSCF 40 and WWSF 30 have a trust relationship and may be authenticated to each other. The eP-CSCF 40 verifies whether the WWSF 30 is authorized to use the IMS ID, based on the HSS provisioning in step S51b. The eP-CSCF 40 may start a validity timer for the binding of the webRTC ID and the IMS ID.

Step S57: The eP-CSCF 40 acknowledges the binding of the webRTC ID and the IMS ID to the WWSF 30 and may provide a validity timer for which period the binding is valid.

Step S58: The WWSF 30 provides the IMS ID, which binds to the webRTC ID, to the WIC 20.

Step S59: The WIC 20 stores the received information and sends a REGISTER message to the eP-CSCF 40, using the IMS ID. This message may be preferably a SIP message but could be based on any other protocol like WebSocket, JSON etc.

Step S60: The eP-CSCF 40 verifies the binding of webRTC ID and IMS ID and authorizes the REGISTER. The eP-CSCF 40 may include an indicator, flag or other parameter, showing that the binding is verified and/or registration is authorized, in the REGISTER so that it does not need to be challenged by the S-CSCF 50. This message may be preferably a SIP message but could be based on any other protocol like WebSocket, JSON etc.

Step S61: The eP-CSCF 40 forwards the REGISTER with the IMS ID to the S-CSCF 50 (potentially via other IMS nodes like IBCF or I-CSCF) and may mark it as described in the previous step. The S-CSCF 50 requests the subscription profile from the HSS 60. This message may be preferably a SIP message but could be based on any other protocol like WebSocket, JSON etc.

Step S62: The S-CSCF 50 acknowledges the registration and retrieves the general subscription profile for this webRTC service provider from the HSS 60. The 200 OK or any other suitable message is forwarded to the WIC 20. This message may be preferably a SIP message but could be based on any other protocol like WebSocket, JSON etc. (Deregistration and Binding Removal)

At some point in time, UE 10 i.e. WIC 20 may not want to be IMS registered any more, then the WIC 20 may not refresh the IMS registration which then may time out based on the expire timer so that the S-CSCF 50 removes the registration.

The WIC 20 may want actively deregister, this has the advantage that terminating calls would fail directly and not due to an undelivered timeout so that the calling party is informed directly. Also free IMS IDs would be available again for assignment to other webRTC IDs.

Figure 6:
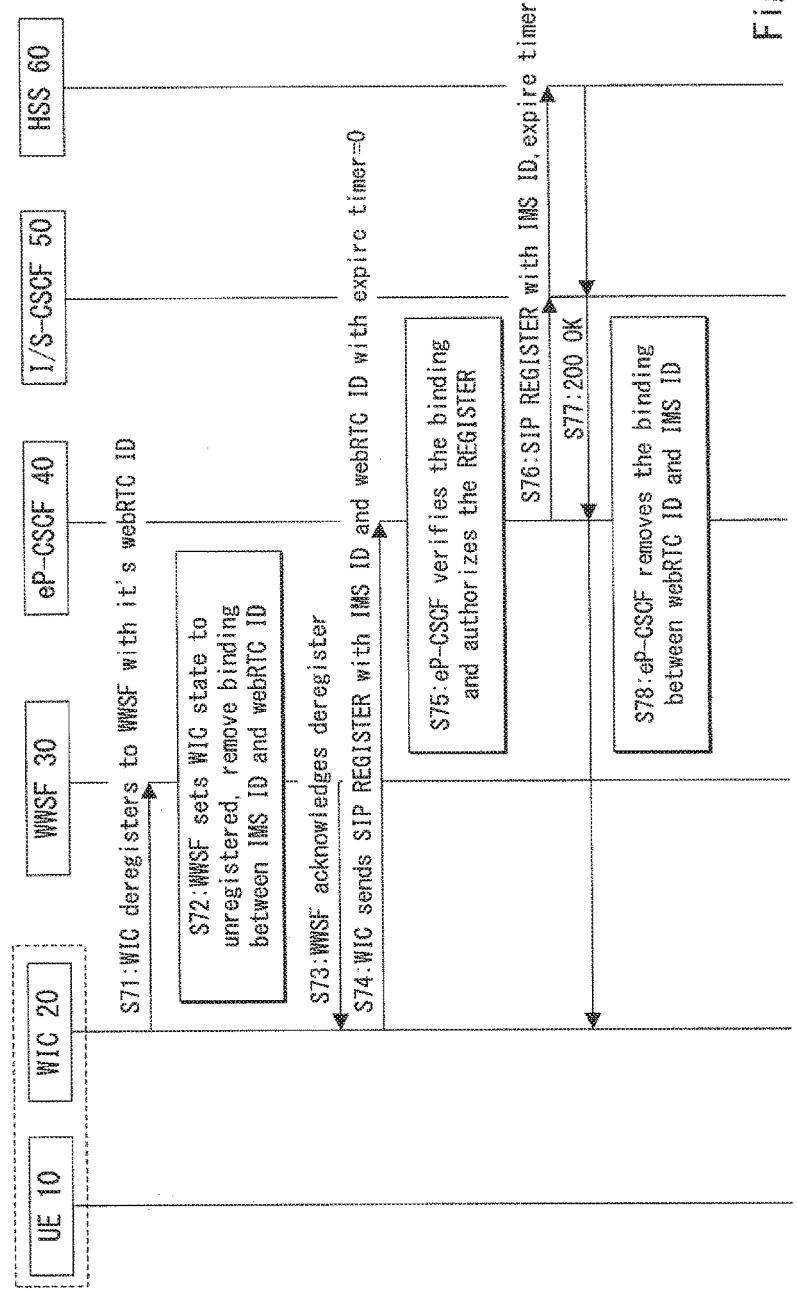
FIG. 6 is a sequence diagram showing an example of unsynchronized deregistration and binding removal in WWSF and eP-CSCF in the second exemplary embodiment.

FIG. 6 shows how the deregistration could take place unsynchronized.

Step S71: The WIC 20 sends a deregistration message to the WWSF 30 with its webRTC ID.

Figure 7:
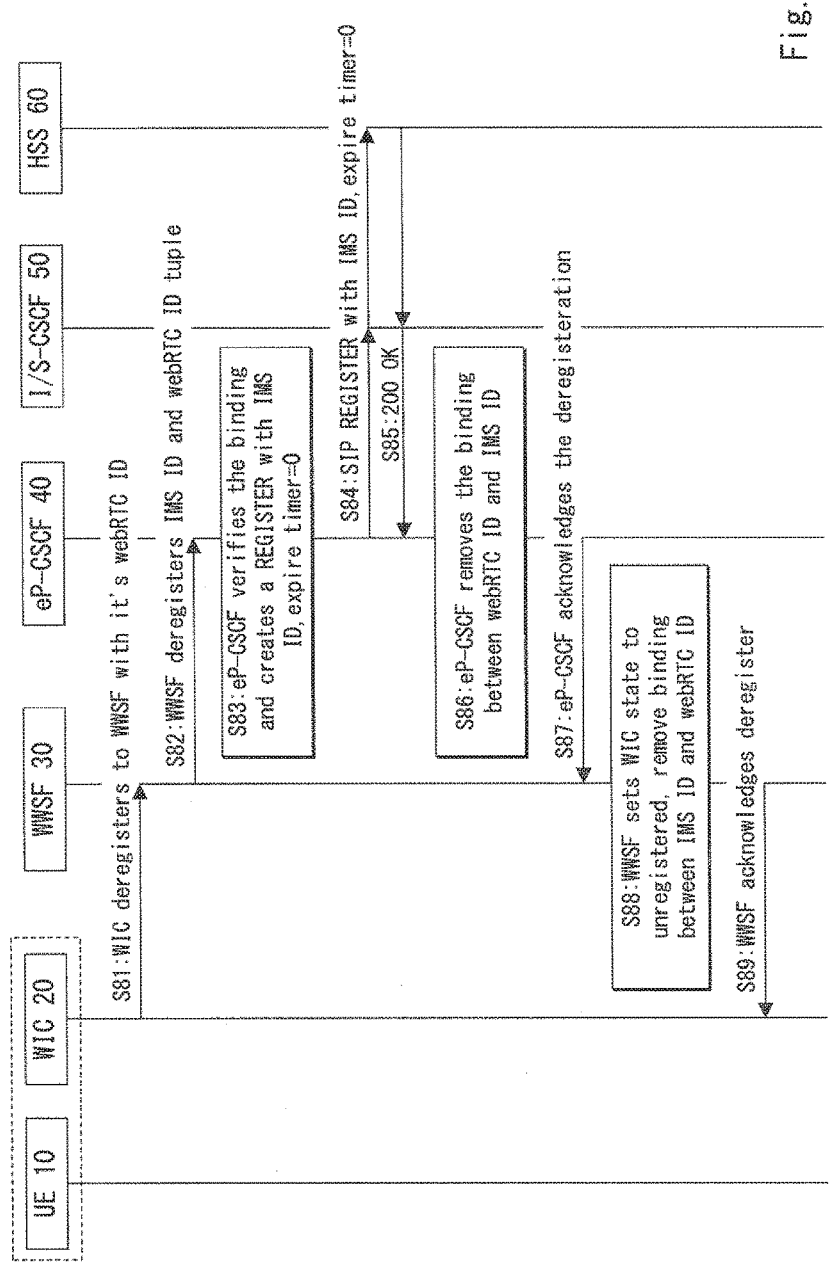
FIG. 7 is a sequence diagram showing an example of synchronized deregistration and binding removal in WWSF and eP-CSCF in the second exemplary embodiment.

Step S72: the WWSF 30 sets the WIC state to unregistered and removes the binding of the webRTC ID with the IMS ID. The WWSF 30 may inform the eP-CSCF 40 about the removal of the binding as shown in FIG. 7.

Step S73: the WWSF 30 acknowledges the deregistration.

Step S74: the WIC 20 sends a REGISTER message with the IMS ID and the webRTC ID and with expiry timer equal to zero to the eP-CSCF 40. This message may be preferably a SIP message but could be based on any other protocol like WebSocket, JSON etc.

Step S75: The eP-CSCF 40 verifies the binding of webRTC ID and IMS ID and authorizes the REGISTER. The eP-CSCF 40 may include an indicator, flag or other parameter, showing that the binding is verified and/or registration is authorized, in the REGISTER so that it does not need to be challenged by the S-CSCF 50. This message may be preferably a SIP message but could be based on any other protocol like WebSocket, JSON etc.

Step S76: The eP-CSCF 40 forwards the REGISTER with the IMS ID to the S-CSCF 50 (potentially via other IMS nodes like IBCF or I-CSCF) and may mark it as described in the previous step. The S-CSCF 50 informs the HSS 60 about the deregistration. This message may be preferably a SIP message but could be based on any other protocol like WebSocket, JSON etc.

Step S77: The S-CSCF 50 acknowledges the deregistration. The 200 OK or any other suitable message is forwarded to the WIC 20. This message may be preferably a SIP message but could be based on any other protocol like WebSocket, JSON etc.

Step S78: Once the eP-CSCF 40 receives the acknowledgement that the IMS deregistration was successful, it removes the binding between webRTC ID and IMS ID.

In a variant of the deregistration, the WIC 20 can directly send the deregistration message in step S74 to the IMS and the eP-CSCF 40 will take care to inform the WWSF 30 about the deregistration and/or the removal of the binding.

FIG. 7 shows another variant how the registration could take place synchronized between webRTC provider and IMS provider.

Step S81: The WIC 20 sends a deregistration message to the WWSF 30 with its webRTC ID.

Step S82: The WWSF 30 sends a deregistration message with the IMS ID and webRTC ID tuple to the eP-CSCF 40. The WWSF 30 may already remove the binding but may do it also at a later stage, e.g. step S88.

Step S83: The eP-CSCF 40 verifies the binding between webRTC ID and IMS ID and creates a REGISTER message with IMS ID and the webRTC ID and with expiry timer equal to zero towards the S-CSCF 50. This message may be preferably a SIP message but could be based on any other protocol like WebSocket, JSON etc.

Step S84: The eP-CSCF 40 sends a REGISTER message with the IMS ID and the webRTC ID and with expiry timer equal to zero to the S-CSCF 50 (potentially via other IMS nodes like IBCF or I-CSCF). The eP-CSCF 40 may include an indicator, flag or other parameter, showing that the binding is verified and/or registration is authorized. The S-CSCF 50 informs the HSS 60 about the deregistration. This message may be preferably a SIP message but could be based on any other protocol like WebSocket, JSON etc.

Step S85: The S-CSCF acknowledges the deregistration. The 200 OK or any other suitable message is forwarded to the eP-CSCF 40. This message may be preferably a SIP message but could be based on any other protocol like WebSocket, JSON etc.

Step S86: The eP-CSCF 40 removes the binding of the webRTC ID and the IMS ID.

Step S87: The eP-CSCF 40 acknowledges the successful deregistration.

Step S88: The WWSF 30 sets the WIC state to unregistered and removes the binding of the webRTC ID with the IMS ID.

Step S89: the WWSF 30 acknowledges to the WIC 20 that it is successfully deregistered.

Third Exemplary Embodiment

Figure 8:
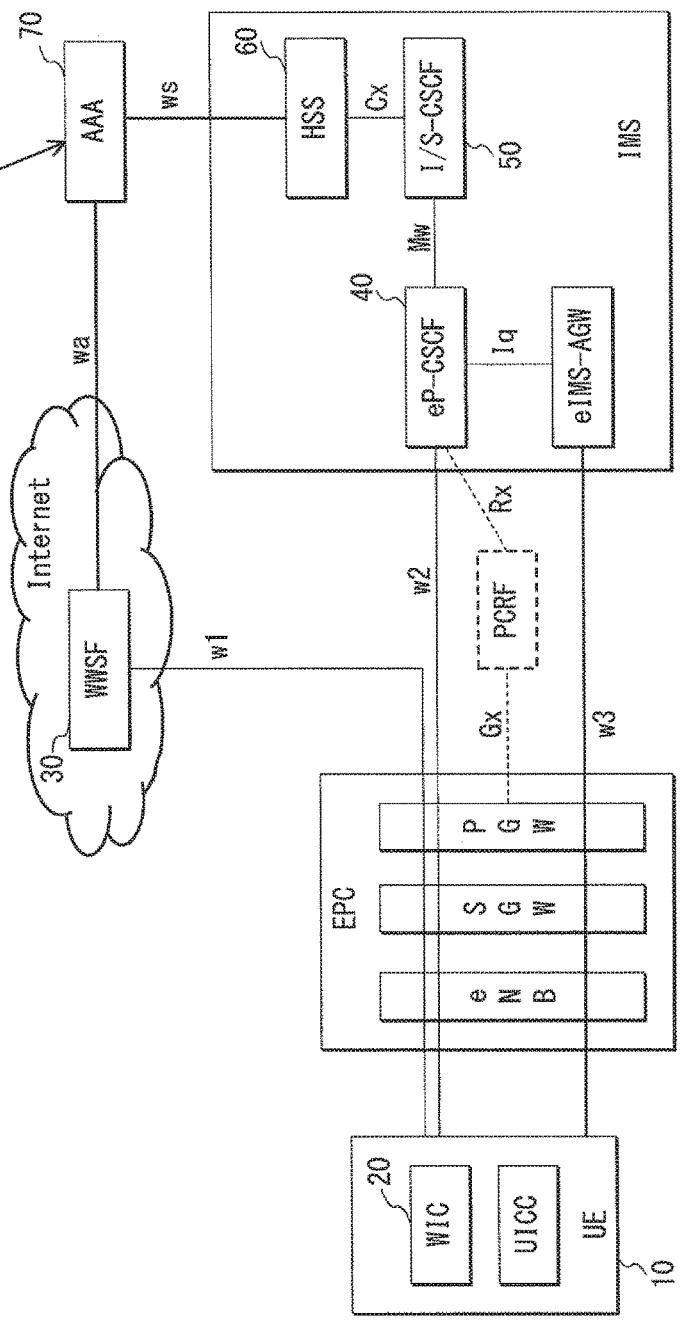
FIG. 8 is a block diagram showing an example of webRTC ID verification in AAA at trusted third party in a third exemplary embodiment according to the present invention.

In this exemplary embodiment, a third party authentication and authorization server is used, which is trusted by the webRTC service provider as well as the IMS operator. The architecture is shown in FIG. 8.

The AAA (Authentication, Authorization and Accounting) 70 provides a token or other mechanism to the WWSF 30 for a specific webRTC ID. The AAA 70 may be located at the webRTC provider, at the mobile operator or in the internet, hosted by a trusted third party. If the WIC 20 uses the token with the correct webRTC ID within a specified time interval, then the HSS 60 will check with the AAA 70 whether the WIC 20 is allowed to register. For this the webRTC user does not need to have an IMS registration nor has the user to be a subscriber of the IMS network or mobile network.

Figure 9:
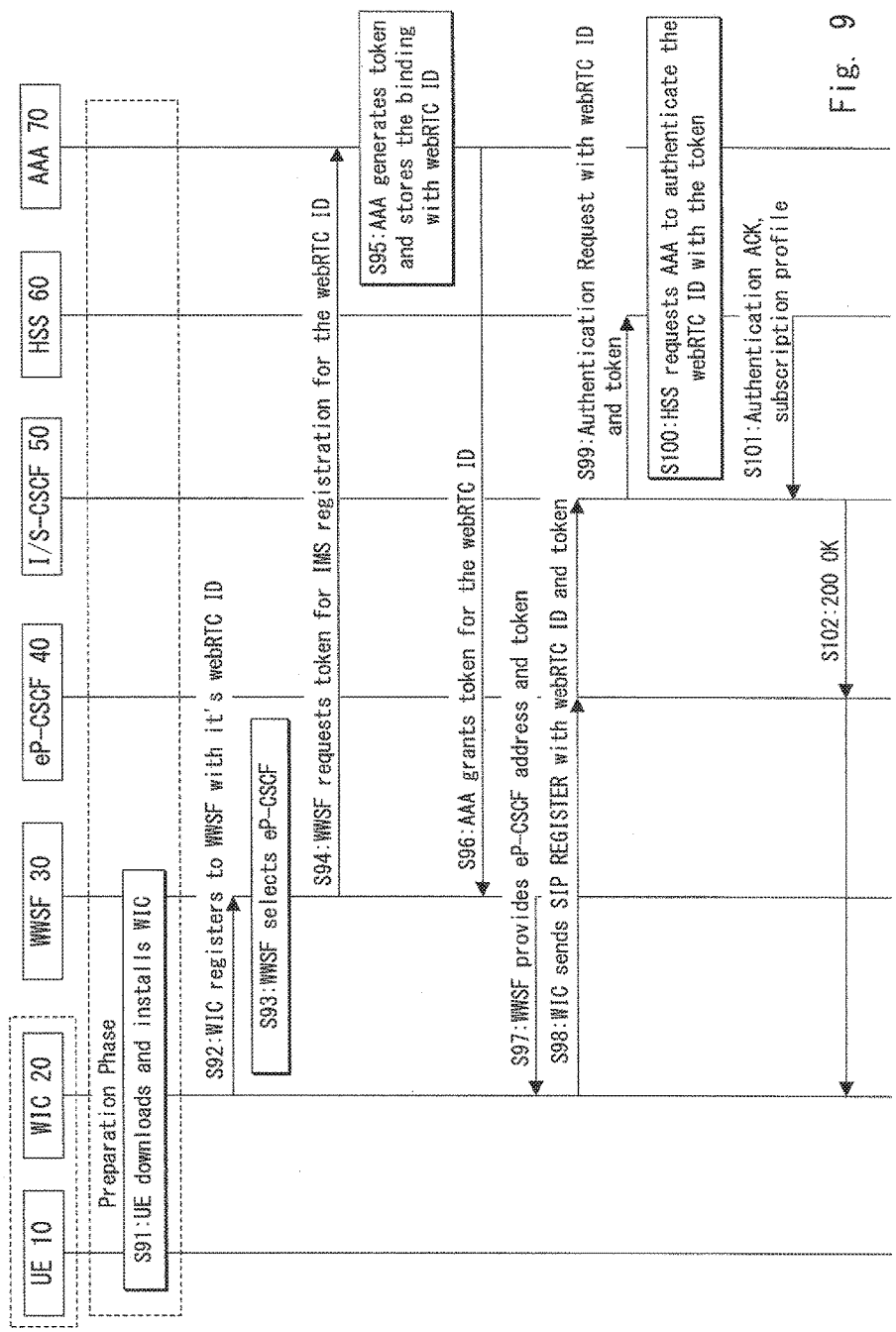
FIG. 9 is a sequence diagram showing an example of call flow for webRTC ID verification in AAA at trusted third party in the third exemplary embodiment.

FIG. 9 shows the call flow of the procedure.

Step S91: From within a WebRTC-enabled browser, the user may access a URI to the WWSF 30 to initiate an HTTPS connection to the WWSF. The TLS connection may provide one-way authentication of the server based on the server certificate. The browser downloads and initializes the WIC 20 from the WWSF 30, now the preparation phase is completed.

Step S92: The WIC 20 registers to the WWSF 30 with its webRTC ID. WWSF 30 may initiate authentication procedure if needed.

Step S93: If the WIC 20 is not preconfigured, the WWSF 30 selects the eP-CSCF 40. It is assumed that the webRTC service provider has a Service Level Agreement with at least one IMS operator, so the WWSF 30 knows the eP-CSCF address(es) and can select one for each specific webRTC ID.

Step S94: The WWSF 30 requests a token from the AAA 70 for the webRTC ID.

Step S95: The AAA 70 generates a token for the webRTC ID and stores the binding. The token may have a limited validity time.

Step S96: The AAA 70 grants the token for the webRTC ID and sends it and optionally related information (e.g. validity timer) to the WWSF 30.

Step S97: The WWSF 30 provides the token and optionally the eP-CSCF address to the WIC 20.

Step S98: The WIC 20 sends a REGISTER with its webRTC ID and token to the eP-CSCF 40 and S-CSCF 50.

Step S99: The S-CSCF 50 performs an authentication request for this webRTC ID and token.

Step S100: The HSS 60 requests the AAA 70 to verify the webRTC ID and token.

Step S101: The HSS 60 acknowledges the authentication and provides the general subscription profile for this webRTC service provider to the S-CSCF 50.

Step S102: The S-CSCF 50 acknowledges the REGISTER with a 200 OK or any other suitable message. (Deregistration and Binding Removal)

At some point in time, UE 10 i.e. WIC 20 may not want to be IMS registered any more, then the WIC 20 may not refresh the IMS registration which then may time out based on the expire timer so that the S-CSCF 50 removes the registration.

The WIC 20 may want actively deregister, this has the advantage that terminating calls would fail directly and not due to an undelivered timeout so that the calling party is informed directly. Also free IMS IDs would be available again for assignment to other webRTC IDs.

Figure 10:
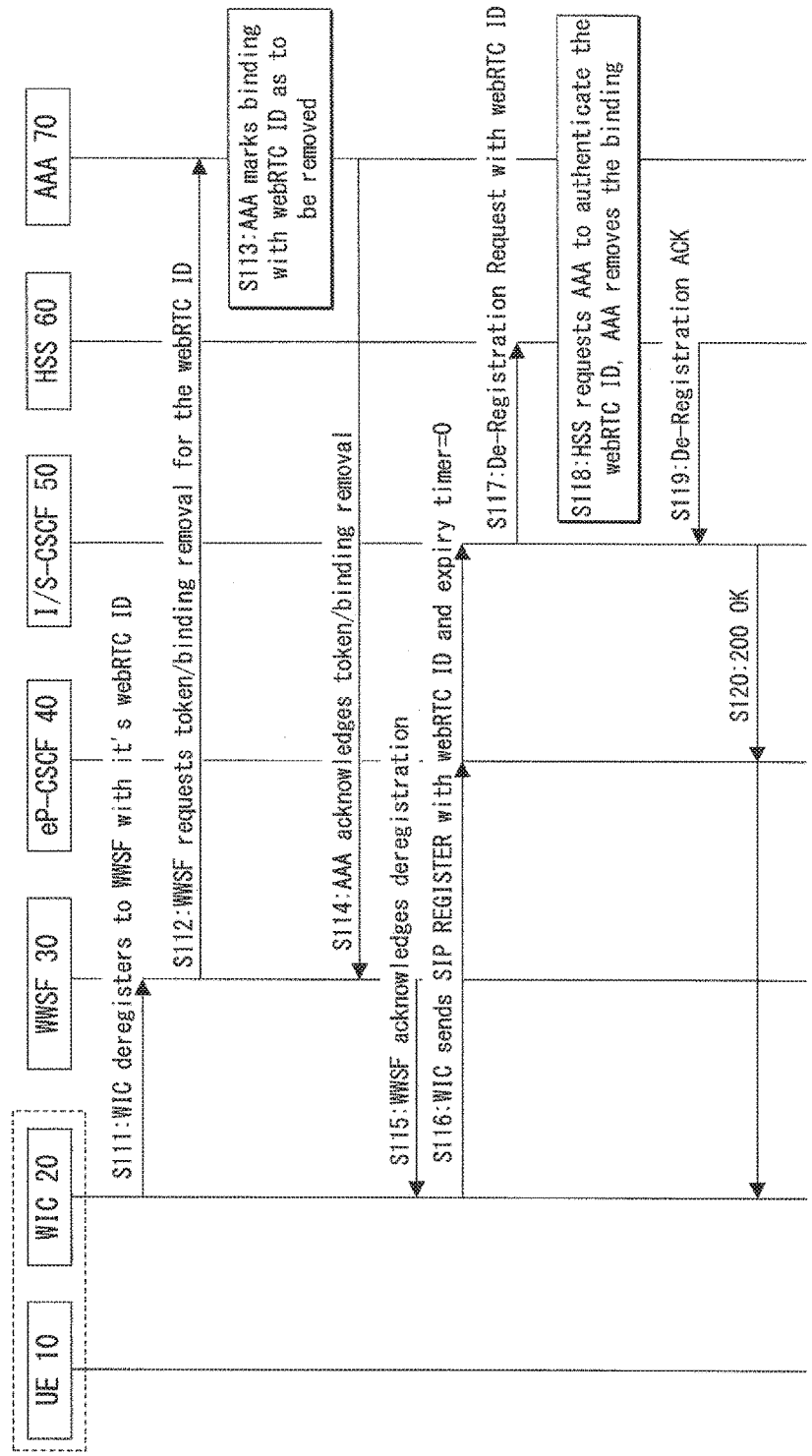
FIG. 10 is a sequence diagram showing an example of unsynchronized deregistration with AAA at trusted third party in the third exemplary embodiment.

FIG. 10 shows how the deregistration could take place unsynchronized.

Step S111: The WIC 20 sends a deregistration message to the WWSF 30 with its webRTC ID.

Step S112: The WWSF 30 sends a request message with the webRTC ID to the AAA 70 to remove the token and/or binding.

Step S113: The AAA 70 marks the binding that it will be removed soon, once the IMS deregistration takes place.

Step S114: The AAA 70 acknowledges that the removal of the token and/or binding information is prepared and that the WIC 20 can now perform IMS deregistration.

Step S115: The WWSF 30 sets the WIC state to unregistered and removes the binding of the webRTC ID with other information and acknowledges to the WIC 20 that it is successfully deregistered.

Step S116: The WIC 20 sends a REGISTER message with the webRTC ID and with expiry timer equal to zero to the S-CSCF 50 (potentially via other IMS nodes like IBCF or I-CSCF). The eP-CSCF 40 may include an indicator, flag or other parameter, showing that the binding is verified and/or registration is authorized.

Step S117: The S-CSCF 50 informs the HSS 60 about the deregistration for the webRTC ID. This message may be preferably a SIP message but could be based on any other protocol like WebSocket, JSON etc.

Step S118: The HSS 60 requests the AAA 70 to authenticate the webRTC ID and to remove the binding. The AAA 70 authenticates the webRTC ID and indicates the HSS 60 that it removed the binding.

Step S119: The HSS 60 acknowledges the deregistration. This message may be preferably a SIP message but could be based on any other protocol like WebSocket, JSON etc.

Step S120: the S-CSCF 50 sends the 200 OK or any other suitable message to the WIC 20. This message may be preferably a SIP message but could be based on any other protocol like WebSocket, JSON etc.

In a variant of the deregistration, the WIC 20 can directly send the deregistration message in step S116 to the IMS and the AAA 70 will take care to inform the WWSF 30 about the deregistration and/or the removal of the binding and/or token.

Figure 11:
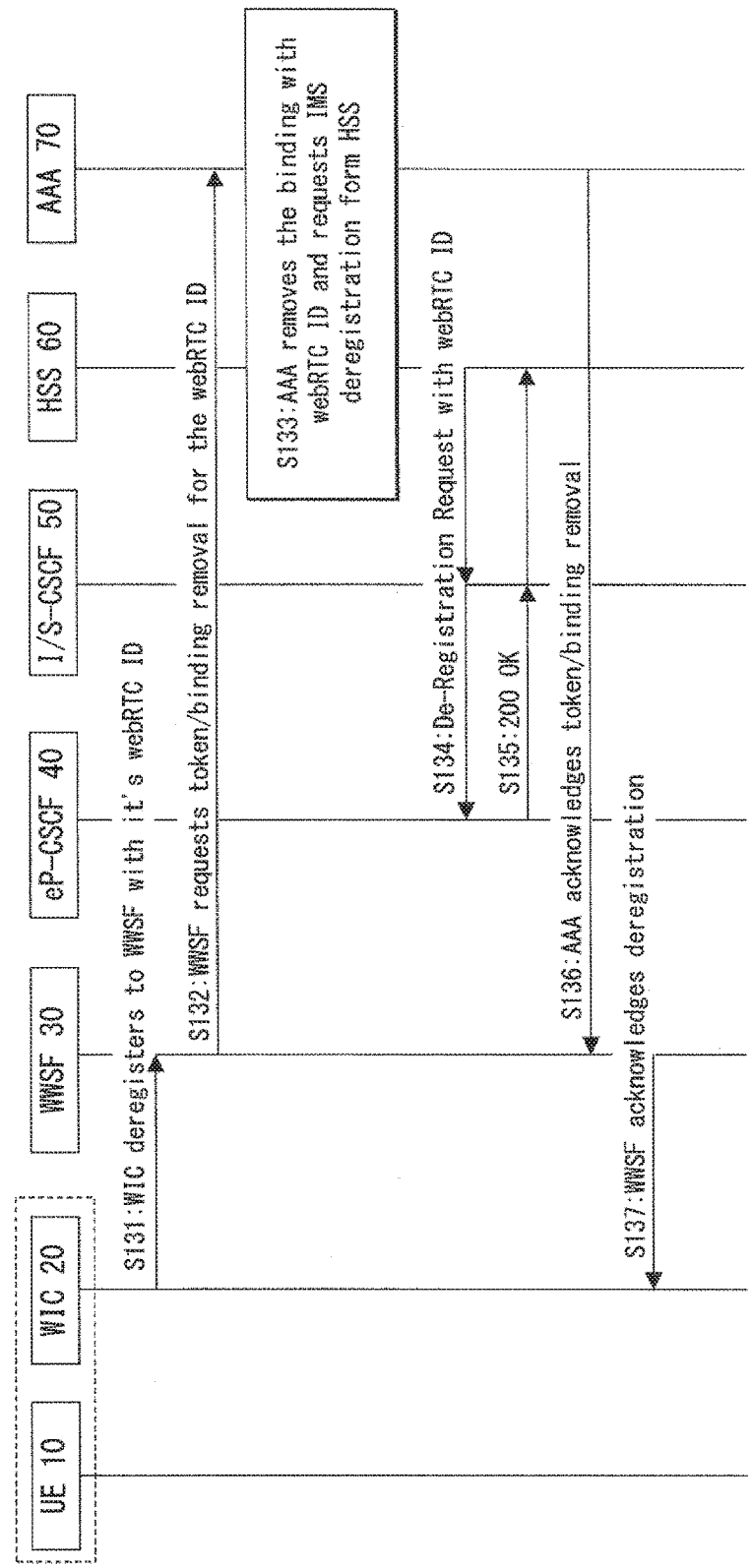
FIG. 11 is a sequence diagram showing an example of synchronized deregistration with AAA at trusted third party in the third exemplary embodiment.
Figure 12:
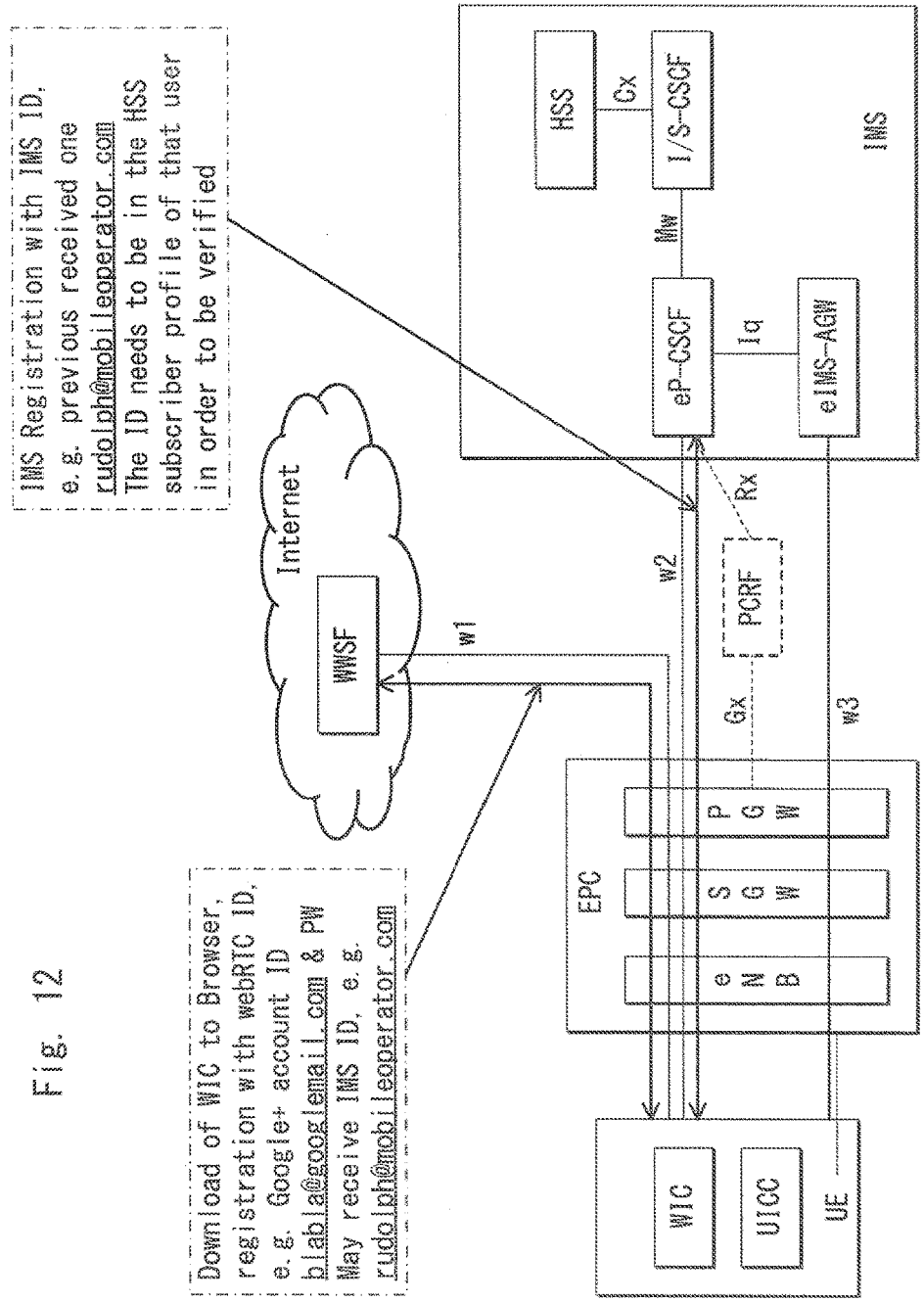
FIG. 12 is a block diagram showing typical identity mapping.

FIG. 11 shows another variant how the registration could take place in a synchronized manner.

Step S131: The WIC 20 sends a deregistration message to the WWSF 30 with its webRTC ID.

Step S132: The WWSF 30 sends a request message with the webRTC ID to the AAA 70 to remove the token and/or binding.

Step S133: The AAA 70 removes the binding and requests IMS deregistration from the HSS 60. The AAA 70 may remove the binding also once it got an acknowledgement from the HSS 60 about the successful deregistration.

Step S134: The HSS 60 sends a REGISTER message with the webRTC ID and with expiry timer equal to zero to the eP-CSCF 40. This message may be preferably a SIP message but could be based on any other protocol like WebSocket, JSON etc.

Step S135: The eP-CSCF 40 acknowledges the deregistration, all nodes in between e.g. S-CSCF 50 remove the subscription profile. This message may be preferably a SIP message but could be based on any other protocol like WebSocket, JSON etc.

Based on the above description, the following document will be proposed to 3GPP.

DISCUSSION

Current webRTC TR 33.abc describes two different solutions for the authentication of the webRTC IMS Client in IMS, based on the assumption that the user has a subscription with an individual IMPU and uses an IMS authentication mechanism (e.g., IMS digest) to authenticate with IMS. This assumption limits the usefulness of the webRTC interworking feature extremely, since there is no point in using webRTC communication if the user has an IMS client and can setup IMS sessions without webRTC.

Current study conclusion in TR 23.701 list the following functionality for the eP-CSCF:

The eP-CSCF verifies any UE authentication performed by the WWSF and performs Trusted Node Authentication (TNA), as defined in TS 33.203, in IMS for UEs already authenticated by the WWSF.

For Web authentication scenarios, the eP-CSCF verifies that the WWSF is authorized to allocate IMS identities that it assigns to a WIC.

The eP-CSCF performs IMS registration for WICs using either IMS or Web authentication schemes.

In order to be able to achieve these required functionalities, the eP-CSCF needs to have knowledge about the used identities of the WWSF.

It is proposed here that the WWSF provides the relevant information to the eP-CSCF as indicated in the original solution 3 of TR 23.701 with the W2 reference point. It is further proposed to overcome the limitation of the required IMS registration by allowing the WWSF to assign from a pool of IMS registrations a valid IMPU to the WIC that desires to register to IMS. The pool of IMS registrations can be easily realized with wildcarded IMPUs.

On request of the WIC, the WWSF provides an IMPU to the WIC and a token for this IMPU to the eP-CSCF. The eP-CSCF can authenticate based on this information the registration request from the WIC.

Proposal:

It is proposed to add the following text into the webRTC TR 33.abc.

6.1.x Authentication of WebRTC IMS Client Using WWSF Token at the eP-CSCF

The WWSF is using a pool of IMS IDs received from the HSS of the IMS operator. The idea behind is that the webRTC service provider does not assume that the webRTC user has an own IMS subscription so the webRTC provider holds a pool of IMS subscriptions that can be assigned to the webRTC IMS client on demand. The pool of IMS IDs can be provided to the WWSF in form of wildcarded IMPUs.

Figure 13:
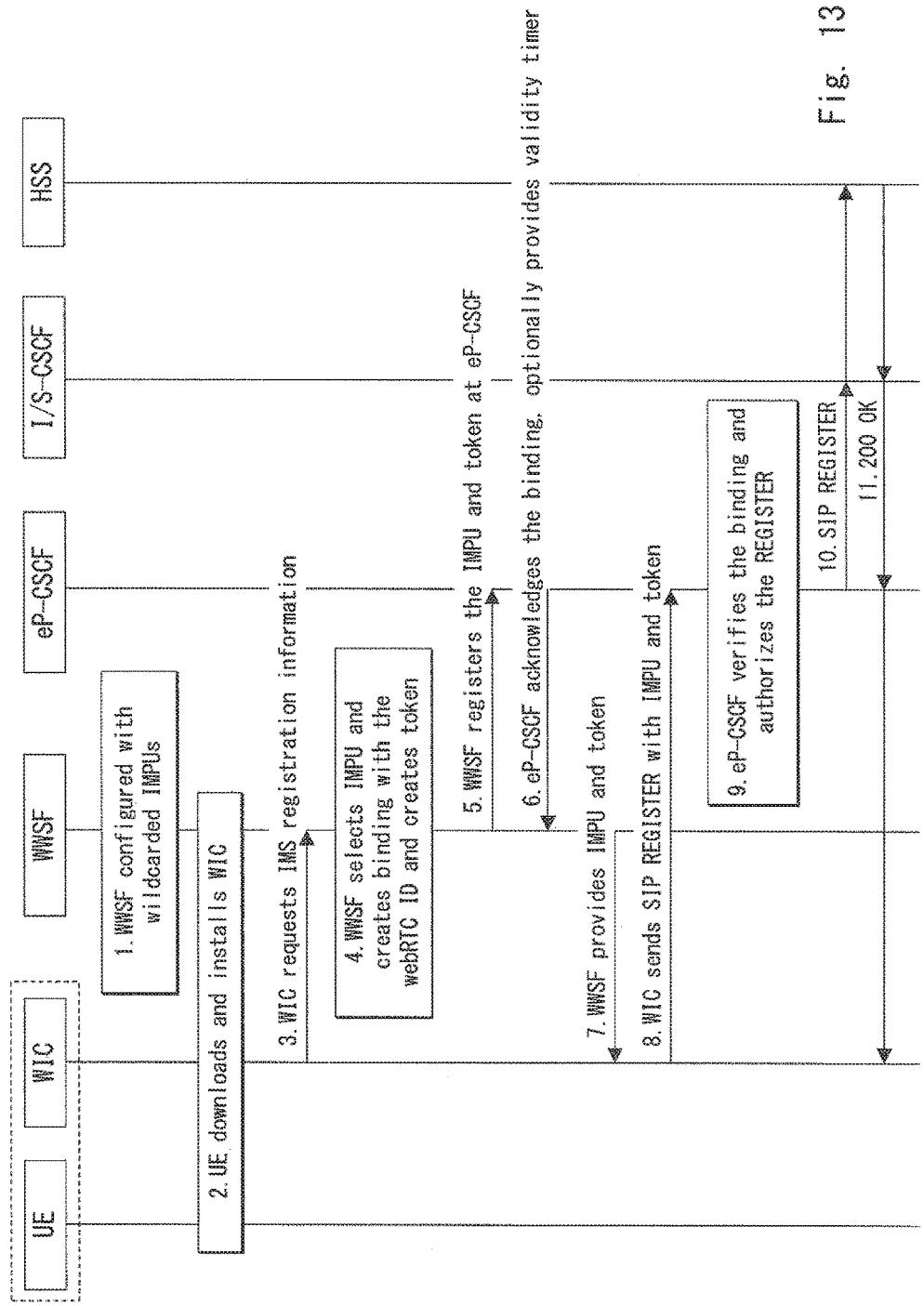
FIG. 13 is a sequence diagram showing WebRTC client authentication with WWSF token, which will be proposed to 3GPP.

FIG. 13 shows the call flow of the authentication procedure.

1: The WWSF is pre-configured with wildcarded IMPUs that will be shared by the webRTC users on demand.

2: From within a WebRTC-enabled browser, the user accesses a URI to the WWSF to initiate an HTTPS connection to the WWSF. The TLS connection provides one-way authentication of the server based on the server certificate. The browser downloads and initializes the WIC from the WWSF.

3: The WIC requests IMS registration information from the WWSF with its webRTC ID. WWSF may initiate authentication procedure if needed.

4: The WWSF generates an IMPU out of the wildcarded IMPUs e.g. based on the webRTC ID. The WWSF binds this IMPU to the webRTC ID and generates a token.

5: The WWSF registers the IMPU and token at the eP-CSCF.

6: The P-CSCF and WWSF have a trust relationship and may be authenticated to each other. The eP-CSCF stores the binding and acknowledges the binding. It may start a validity timer for the binding and provides the timer to the WWSF.

7: The WWSF provides the IMPU and token, which binds to the webRTC ID, to the WIC.

8: The WIC stores the received information and sends a REGISTER message to the eP-CSCF, using the IMPU and token.

9: The eP-CSCF verifies the binding of IMPU and token and authorizes the REGISTER. The eP-CSCF may include an indicator, flag or other parameter, showing that the binding is verified and/or registration is authorized, in the REGISTER so that it does not need to be challenged by the S-CSCF.

10: The eP-CSCF forwards the REGISTER to the S-CSCF. The S-CSCF requests the subscription profile from the HSS.

11: The S-CSCF acknowledges the registration and retrieves the general subscription profile for this webRTC service provider from the HSS. The 200 OK message is forwarded to the WIC.

Figure 14:
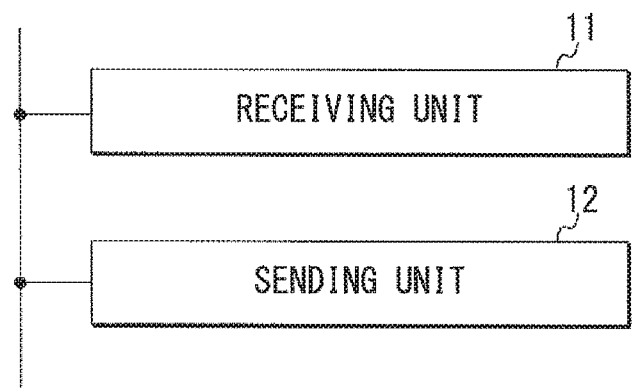
FIG. 14 is a block diagram showing a configuration example of a UE according to the present invention.

FIG. 14 shows a configuration example of the UE 10 in this authentication procedure. As shown in FIG. 14, the UE 10 includes at least a receiving unit 11 and a sending unit 12. The receiving unit 11 receives the token from the WWSF 30 in the IMS registration, and receives the 200 OK message from the S-CSCF 50. As described above, the S-CSCF 50 receives the subscription profile from the HSS 60, via the eP-CSCF 40. The sending unit 12 sends the REGISTER message with the token to the eP-CSCF 40. As described above, the eP-CSCF 40 verifies the token and forwards the REGISTER message to the S-CSCF 50. The UE 10 may request information for the IMS registration from the WWSF 30 on initiation of the authentication thereof. The receiving unit 11 may receive the IMPU together with the token from the WWSF 30. The sending unit 12 may sends the REGISTER message with the IMPU and the token to the eP-CSCF 40. As described above, the eP-CSCF 40 verifies the IMPU together with the token. Moreover, as described above, the UE 10 can download the WIC 20 from the WWSF 30, thereby functioning/operating as the WIC 20. Note that these units 11 and 12 are mutually connected with each other through a bus or the like. These units 11 and 12 can be configured by, for example, a transceiver which conducts communication with the WWSF 30 and the eP-CSCF 40, through an EPC (Evolved Packet Core) shown in each of FIGS. 1, 3 and 8, and a controller such as a CPU (Central Processing Unit) which control this transceiver to execute the processes shown in each of FIGS. 2, 4 to 7, 9 to 11 and 13, or processes equivalent thereto.

Note that the present invention is not limited to the above-mentioned exemplary embodiments, and it is obvious that various modifications can be made by those of ordinary skill in the art based on the recitation of the claims.

The whole or part of the exemplary embodiments disclosed above can be described as, but not limited to, the following supplementary notes.

(Supplementary Note 1)

Binding of webRTC ID and IMS ID
  a. The binding can be created at HSS, WWSF, or AAA.
  b. The binding can be provided to a (network) entity, for example, HSS→WWSF, WWSF→eP-CSCF.
  c. The verification of binding can be carried at the entity which created the binding or at the entity which is provided with binding.
  d. Removal of the binding inclusive the IMS deregistration once it is not needed anymore.

(Supplementary Note 2)

With verification of the above described binding, operator can perform authentication and authorization when UE WIC access IMS service with a web identity (webRTC ID).

(Supplementary Note 3)

Validity time limited authentication and authorization for sending the registration message from the WIC.

(Supplementary Note 4)

eP-CSCF assignment to UE WIC via WWSF.

(Supplementary Note 5)

Using static webRTC ID to IMS ID binding or dynamic binding to a pool of IMS IDs as well as using the webRTC ID instead of an IMS ID.

This application is based upon and claims the benefit of priority from Japanese patent application No. 2013-262170 filed on Dec. 19, 2013, and Japanese patent application No. 2014-002633, filed on Jan. 9, 2014, the disclosures of which are incorporated herein in their entireties by reference.

REFERENCE SIGNS LIST

10 UE
11 RECEIVING UNIT
12 SENDING UNIT
20 WIC
30 WWSF
40 eP-CSCF
50 I/S-CSCF
60 HSS
70 AAA

The invention claimed is:

1. An authentication method in a communication system, the method comprising:
   sending a token from a WWSF (WebRTC (Web Real Time Communication) Web Server Function) to a UE (User Equipment) in an IMS (IP (Internet Protocol) Multimedia Subsystem) registration, wherein the token is generated by binding an IMPU (IMS public user identity) to a webRTC ID (Identity) received by the WWSF from the UE, and the token is transmitted from the WWSF to the UE;
   sending a REGISTER message with the token from the UE to an eP-CSCF (enhanced Proxy-CSCF (Call Session Control Function));
   verifying the token by the eP-CSCF, the token having an effective time;
   forwarding the REGISTER message from the eP-CSCF to an S-CSCF (Serving-CSCF);
   receiving a subscription profile from an HSS (Home Subscriber Server) to the S-CSCF; and
   sending a 200 OK message from the S-CSCF to the UE via the eP-CSCF.

2. The authentication method according to claim 1, further comprising:
   requesting, by the UE, information for the IMS registration from the WWSF on the initiation of the authentication method.

3. The authentication method according to claim 1, further comprising:
   requesting, by the WWSF, the token from an authorization node.

4. The authentication method according to claim 1,
   wherein the WWSF sends an IMPU (IMS public user identity) together with the token to the UE,
   wherein the UE sends the REGISTER message with the IMPU together with the token to the eP-CSCF, and
   wherein the eP-CSCF verifies the IMPU together with the token.

5. The authentication method according to claim 1, wherein the UE comprises a WIC (WebRTC IMS Client).

6. A communication system for authenticating a UE (User Equipment), the system comprising a WWSF (WebRTC (Web Real Time Communication) Web Server Function), an eP-CSCF (enhanced Proxy-CSCF (Call Session Control Function)), an S-CSCF (Serving-CSCF), and an HSS (Home Subscriber Server),
   wherein the WWSF, eP-CSCF, S-CSCF, and HSS each comprise:
   at least one memory storing instructions; and
   at least one processor configured to execute the instructions such that:
   the WWSF sends a token to the UE in an IMS (IP (Internet Protocol) Multimedia Subsystem) registration, the token is generated by binding an IMPU (IMS public user identity) to a webRTC ID (Identity) received by the WWSF from the UE, and the token is transmitted from the WWSF to the UE;
   the UE sends a REGISTER message with the token to the eP-CSCF;
   the eP-CSCF verifies the token, the token having an effective time;
   the eP-CSCF forwards the REGISTER message to the S-CSCF;
   the S-CSCF receives a subscription profile from the HSS; and
   the S-CSCF sends a 200 OK message to the UE via the eP-CSCF.

7. The communication system according to claim 6, wherein the UE requests information for the IMS registration from the WWSF.

8. The communication system according to claim 6, further comprising an authorization node,
   wherein the WWSF requests the token from the authorization node.

9. The communication system according to claim 6,
   wherein the WWSF sends an IMPU (IMS public user identity) together with the token to the UE,
   wherein the UE sends the REGISTER message with the IMPU together with the token to the eP-CSCF, and
   wherein the eP-CSCF verifies the IMPU together with the token.

10. The communication system according claim 6, wherein the UE comprises a WIC (WebRTC IMS Client).

11. An authentication method of a UE (User Equipment) comprising:
    receiving a token from a WWSF (WebRTC (Web Real Time Communication) Web Server Function) in an IMS (IP (Internet Protocol) Multimedia Subsystem) registration, wherein the token is generated by binding an IMPU (IMS public user identity) to a webRTC ID (Identity) received by the WWSF from the UE, and the token is transmitted from the WWSF to the UE;
    sending a REGISTER message with the token to an eP-CSCF (enhanced Proxy-CSCF (Call Session Control Function)) that verifies the token having an effective time and forwards the REGISTER message to an S-CSCF (Serving-CSCF); and
    receiving a 200 OK message from the S-CSCF, the S-CSCF receiving a subscription profile from an HSS (Home Subscriber Server), via the eP-CSCF.

12. The authentication method according to claim 11, further comprising:
    requesting information for the IMS registration from the WWSF on the initiation of the authentication method.

13. The authentication method according to claim 11, wherein the UE receives an IMPU (IMS public user identity) together with the token from the WWSF, wherein the UE sends the REGISTER message with the IMPU together with the token to the eP-CSCF that verifies the IMPU together with the token.

14. The authentication method according to claim 11, wherein the UE comprises a WIC (WebRTC IMS Client).

15. A UE (User Equipment) connectable to a communication system including a WWSF (WebRTC (Web Real Time Communication) Web Server Function), an eP-CSCF (enhanced Proxy-CSCF (Call Session Control Function)), an S-CSCF (Serving-CSCF), and an HSS (Home Subscriber Server), the UE comprising:
   at least one memory storing instructions; and
   at least one processor configured to execute the instructions to:
      receive a token from the WWSF in an IMS (IP (Internet Protocol) Multimedia Subsystem) registration and receive a 200 OK message from the S-CSCF, the S-CSCF receiving a subscription profile from the HSS, via the eP-CSCF, wherein the token is generated by binding an IMPU (IMS public user identity) to a webRTC ID (Identity) received by the WWSF from the UE, and the token is transmitted from the WWSF to the UE; and
      send a REGISTER message with the token to the eP-CSCF, the eP-CSCF verifying the token having an effective time and forwarding the REGISTER message to the S-CSCF.

16. The UE according to claim 15, wherein the UE requests information for the IMS registration from the WWSF.

17. The UE according to claim 15, wherein the at least one processor is further configured to execute the instructions to:
   receive an IMPU (IMS public user identity) together with the token from the WWSF; and
   send the REGISTER message with the IMPU together with the token to the eP-CSCF that verifies the IMPU together with the token.

18. The UE according to claim 15, wherein the UE comprises a WIC (WebRTC IMS Client).

* * * * *